United States Patent [19]

Martin, Jr.

[11] Patent Number: 4,688,846

[45] Date of Patent: Aug. 25, 1987

[54] FABRIC CAB

[76] Inventor: Robert P. Martin, Jr., c/o Martin Sheet Metal, Inc., 7108 Madison Ave., Cleveland, Ohio 44102

[21] Appl. No.: 723,189

[22] Filed: Apr. 15, 1985

[51] Int. Cl.[4] .......................... B60J 7/00; B62D 25/06

[52] U.S. Cl. .................................... 296/102; 296/148; 296/190

[58] Field of Search ............... 296/78 R, 83, 102, 138, 296/140-141, 190, 148, 147, 136; 160/368 S, DIG. 4, DIG. 8, DIG. 10, DIG. 18; 135/119

[56] References Cited

U.S. PATENT DOCUMENTS

| | | | |
|---|---|---|---|
| 1,894,527 | 1/1933 | Yengst | 296/138 |
| 1,925,815 | 9/1933 | Nicolson | 135/119 X |
| 2,168,913 | 8/1939 | Middleton | 135/119 X |
| 2,188,747 | 1/1940 | Bittick | 135/119 X |
| 2,430,442 | 11/1947 | Acheson | 296/138 X |
| 2,463,646 | 3/1949 | Schassberger | 296/104 |
| 2,479,036 | 8/1949 | Campbell | 296/102 |
| 2,620,224 | 12/1952 | Hedley | 296/148 |
| 3,167,349 | 1/1965 | Young et al. | 296/102 X |
| 3,192,542 | 7/1965 | Mills, II | 135/119 X |
| 3,751,862 | 8/1973 | Linecker | 135/119 X |
| 4,220,298 | 9/1980 | Willis | 296/148 X |

*Primary Examiner*—Robert B. Reeves
*Assistant Examiner*—Russell D. Stormer
*Attorney, Agent, or Firm*—Pearne, Gordon, McCoy & Granger

[57] ABSTRACT

A fabric cab for a work vehicle affording excellent visibility through extensive window areas, and high functional utilization of materials without significant material waste in its fabrication. Faces of the cab are fabricated by joining separate fabric strips together and to window elements at the corners and margins of the cab. Side faces of the cab include flexible roll up doors removably attached to the cab for repair or replacement. Side sections of the cab are fitted with fasteners that allow the cab to be knocked down for storage and shipment by folding it on regular corners.

4 Claims, 6 Drawing Figures

FABRIC CAB

BACKGROUND OF THE INVENTION

The invention relates to cab enclosures for work vehicles and, more specifically, to cabs of this general type constructed of flexible sheet material.

Prior Art

Fabric cabs on industrial fork lift trucks and like vehicles protect the operator from adverse environmental conditions, including rain, wind, dust, etc. Typically, a fabric cab is fitted over and supported by the framework of an overhead guard mounted on the truck chassis. Fabric cabs, in comparison with rigid steel cabs, are relatively inexpensive to manufacture, ship, and install, and therefore have a significant cost advantage. Traditionally, fabric cab faces have been fabricated from a single sheet of canvas or other like material. A window or light is provided in the face sheet by cutting out a central area and affixing a clear plastic film across the cutout area. This conventional construction has the inherent disadvantage of producing a relatively large percentage of scrap fabric, since the window cutout is generally too small to be used for another face or major component of the cab. Often, the window cutout area is relatively small, seemingly to minimize this waste. This approach, however, has the disadvantage of limiting the view afforded the operator.

Another problem encountered with prior art fabric cabs has been the difficulty in collapsing them for storage and shipment. Customarily, the cabs have the general shape of a box and cannot be folded on themselves without developing creases through at least some of the window areas. Such creases can become permanent after an extended period in the folded condition, as often occurs during inventory and shipping cycles.

A still further disadvantage of prior fabric cabs is that their doors are often permanently fixed to the remaining parts of the cab. The doors can be subject to rates of wear and tear higher than other parts of the cab because of their location and their constant usage for access and egress.

SUMMARY OF THE INVENTION

The invention provides a fabric cab construction that affords exceptionally good visibility to the operator, achieves high functional utilization of materials, and avoids excessive waste of fabric materials in its fabrication. The cab construction in accordance with the invention has its corner and marginal areas formed of individual fabric strips joined together to form the outlines of the cab faces. Typically, strips or elongated pieces of fabric are sewn or otherwise secured to both sides of the edges of window material. The fabric serves to reinforce the edges of the window material and, additionally, where the cab engages underlying portions of a supporting overhead guard framework or the vehicle frame body, serves as a rub-resistant padding.

High strength and durability are achieved at the corners and margins due to the double plies of fabric in these areas. Because of this double fabric ply construction, the width of the fabric strips can be minimized to afford a generally unrestricted view for the operator. Preferably, at the corners of the cab, the outer fabric strips wraps around from one face to another, and thereby serves to join associated faces together.

Each side wall of the cab is provided with a door, preferably in the form of a generally rectangular panel or flap zippered or otherwise releasably secured at its vertical edges to adjacent edges of stationary sections of the side wall. In the illustrated embodiment, the door is substantially entirely flexible so that it can be rolled up and stored adjacent its upper edge at which it is attached to the roof area of the cab. An important feature of the invention is the manner in which the upper edge of the door is releasably attached to the adjacent cab area. The releasable attaching means ideally is independent of the zipper closure action. When the door has become worn through extended use or accidentally damaged to the point where it requires repair or replacement, it can be unfastened at the attachment means and worked on at a remote location with a sewing machine or other shop equipment, or be replaced with a substitute unit.

Another feature of the fabric cab embodying the invention is a "knock down" construction which allows it to be completely manufactured in such a way that it can be folded flat on itself and optionally rolled on itself for storage and shipment. This folding can be accomplished exclusively along regular corners and fold lines of the product, so that unsightly, vision-distorting permanent creases are not developed in the flats of the cab side walls, particularly in the window areas. This foldability feature is achieved by incorporating attachment means in certain corner seams that are not utilized until field erection of the cab. The attachment means allows the side and front walls to be wrapped into corners of the boxlike cab structure during erection of the cab and then be secured by the attachment means.

DESCRIPTION OF THE PREFERRED EMBODIMENT

Figure 1:
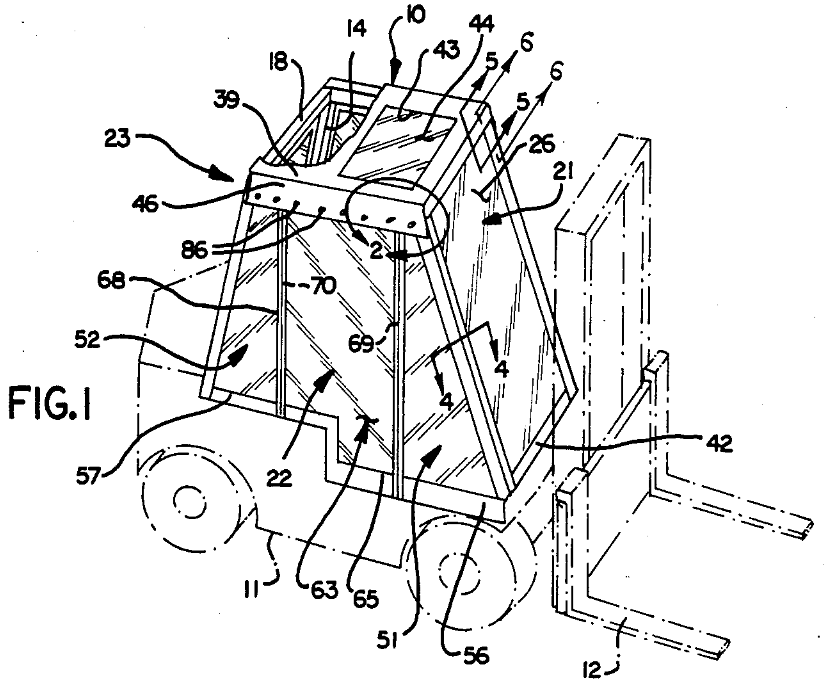
FIG. 1 is a perspective view of a fabric cab constructed in accordance with the invention.
Figure 3:
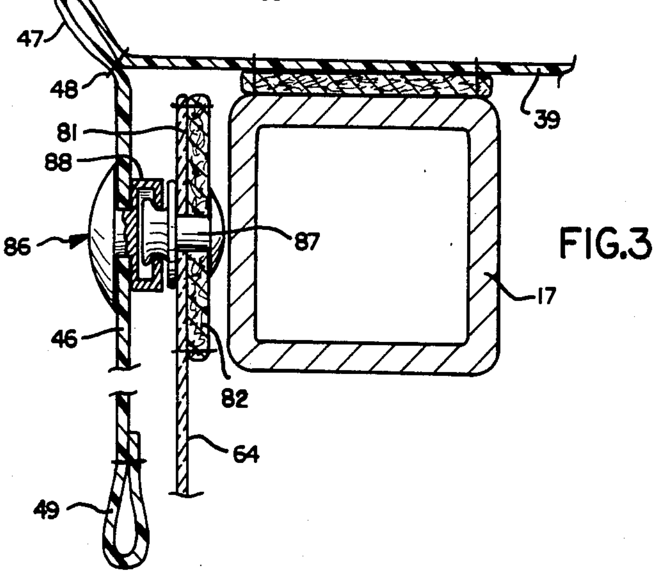
FIG. 3 is an enlarged, fragmentary, cross-sectional view of the cab at the intersection of a side wall and roof panel of the cab taken in the plane 3—3 indicated in FIG. 2.

A fabric cab 10 constructed in accordance with the invention is installed on a work vehicle shown in phantom at 11 in FIG. 1. The illustrated vehicle 11 is a generally conventional fork lift truck, supported on front and rear sets of wheels and having a fork 12 at its front end. The cab 10 overlies and protects the station where the person operating the vehicle 11 sits. The cab is closely fitted over a rigid space frame, typically formed of rectangular steel tubing or like material that is conventionally supplied with the vehicle to guard the operator from overhead falling objects. The overhead guard frame is in the general configuration of the outline of a box, with rectangular or trapezoidal faces. The overhead guard frame is bolted or otherwise secured to the frame of the vehicle 11. The frame typically is a weldment that includes generally upright front and rear corner posts 13, 14 (FIG. 4, FIG. 1) and generally horizontal front, side, and rear header elements 16, 17, and 18 (FIG. 5, FIG. 3, and FIG. 1). As indicated, these corner posts 13, 14, and header elements 16–18 are formed of rectangular or square steel tubing, and their faces are generally aligned with the faces of the cab 10.

The cab 10 is an assembly of fabric and flexible plastic window material. The outer fabric layers (hereinafter called "coated fabric") are of a waterproof, tear-resistant material such as vinyl-coated fabric, and the transparent window sheet material (hereinafter called "window material") is a preferably clear, flexible plastic such as vinyl, of a thickness of 0.019 inch.

In accordance with the invention, the major portion of the area of each of the front, side, and rear faces 21, 22, and 23, respectively, of the cab is provided by single-ply sheets of the described window material. As set out in greater detail below, the window elements are interconnected by strips or sheets of the coated fabric. The left and right side faces 22 of the cab are mirror images of one another in the disclosed embodiment. The front face 21 of the cab 10 includes a windshield 26 formed of a generally rectangular piece of window material. Generally vertical edges 27 of the window 26 are each sandwiched between corner strips 28 of coated fabric and a relatively thick fabric rub strip or pad 29. The rub strip 29 and separate additional rub strips discussed below are conveniently formed of fabric belting material in a 2" width, for example. It will be understood that the illustrated thicknesses of the various layers of window material, coated fabric, and fabric rub strip, while generally proportional, are exaggerated in the various figures for visual display purposes.

Figure 4:
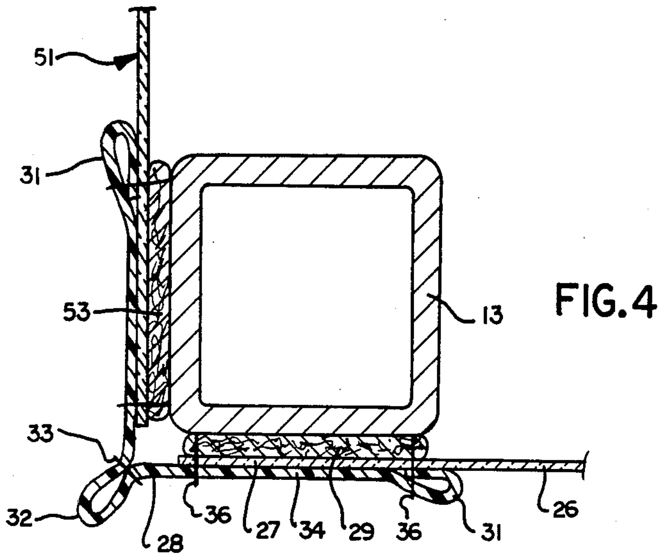
FIG. 4 is an enlarged, fragmentary cross-sectional view of a generally vertical corner of the cab taken at the plane 4—4 in FIG. 1.
Figure 5:
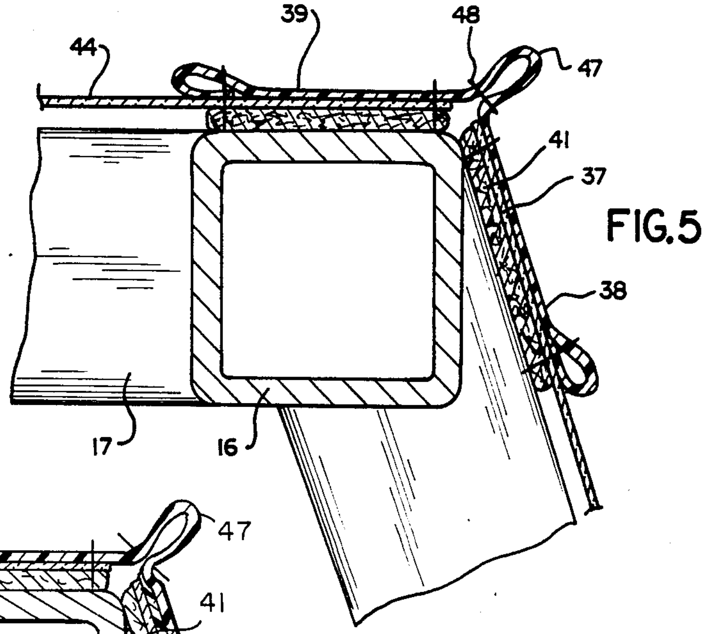
FIG. 5 is an enlarged, fragmentary, cross-sectional view of a front top corner and of the cab taken at the plane 5—5 indicated in FIG. 1.
Figure 6:
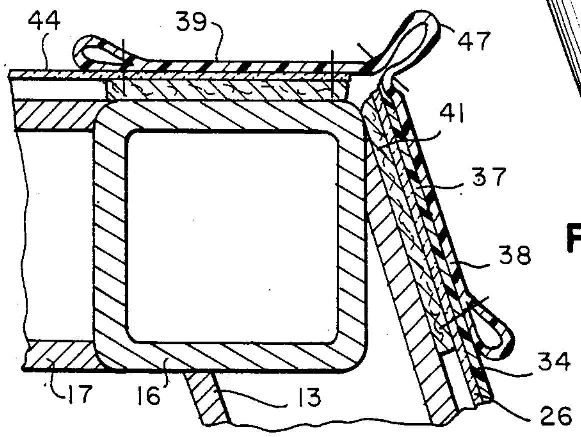
FIG. 6 is an enlarged fragmentary, cross-sectional view of a front lower corner of the cab taken at the plane 6—6 indicated in FIG. 1.

The construction of the coated fabric corner strip 28 is illustrated most clearly in FIG. 4. The corner strip 28 is generally typical of all of the corner strips. The corner strip 28 is an elongated piece of coated fabric which is folded over or hemmed at 31 with thread stitches along both of its longitudinal edges. Adjacent its centerline, the corner strip 28 is folded on itself at 32 and the fold is permanently set by means such as a thread stitch 33 running parallel to the fold. The fold 32 is effective to cause the corner strip 28 to follow the right angle configuration of the underlying faces of the overhead guard corner post 13 and otherwise register with this rigid element.

As typically shown in FIG. 4, a rub strip 29 underlies a forward leg or flange 34 of the right angle corner strip 28. The associated vertical edge 27 of the windshield is sandwiched between this corner strip flange 34 and the rub strip 29. The rub strip 29, windshield edge 27, and corner strip flange 34 are permanently assembled together by thread stitches 36. It will thus be seen that the rub strip 29, as well as other rub strips discussed below, serves the dual purposes of avoiding abrasion-induced wear at points where the cab contacts the overhead guard or surfaces of the truck and of distributing tensile forces in the thread stitches holding the various elements together through a relatively large volume of material. This latter function reduces the risk that threads used to hold the elements of the cab together will tear through the window material. The corner strip 28 and rub strip 29 also reinforce the window edge 27.

As indicated in FIG. 5, a top edge 37 of the windshield 26 is assembled between a depending flange 38 of a roof panel 39 of coated fabric and a rub strip 41. In the illustrated case, the roof panel 39 is formed of the same coated fabric as that of the corner strips 28 and has essentially the same hem and fold construction as such corner strips. The rub strip 41, top window edge 37, and depending flange 38 are held in assembled relation by thread stitches. A lower edge of the windshield 26 has a strip 42 of coated fabric sewn to its outer surface and a rub strip (not shown) affixed by sewing to its inner surface where this area of the cab abuts the frame of the vehicle 11. It will be understood that the coated fabric strips 28, 42, and 38 which are bound to the four edges of the rectangular windshield 26 are originally separate and distinct fabric pieces which are joined together during fabrication of the cab by common assembly to the windshield and by suitable stitching together where their adjacent ends abut. The rear face 23 of the cab 10 has a construction which is essentially the same as the front face 21.

The roof panel 39 is a generally rectangular sheet of coated fabric. A rear edge of the panel 39 forms a depending flange for the rear face 23 of the cab in essentially the same manner as the depending flange 38. A generally rectangular cutout hole 43 is formed in a forward section of the roof panel 39 to afford an overhead view for the operator of the lift truck 11. The cutout 43 is closed by a rectangular sheet of window material 44 disposed across the underside of the cutout and sewn along its perimeter to the roof panel 39.

At the side faces 22 of the cab 10, associated edges of the roof panel 39 are turned down to form a drip shield 46. The roof panel, parallel to its drip shield portions 46, is folded on itself at 47, and these folds 47 are permanently fixed by thread stitches 48. At their lower edges, the drip shields 46 are hemmed at 49.

The side faces 22 of the cab, in the illustrated case, each include front and rear quadrilateral window sections 51,52. Each of the window sections is comprised primarily of a sheet of window material. FIG. 4 illustrates a typical way in which respective front and rear edges of these side window sections 51,52 are assembled to their associated corner strips 28 and rub strips 53. The assembly is essentially the same as that described above for the vertical edges 27 of the windshield 26. At their lower edges, the side window sections 51,52 are provided with individual strips 56,57 of coated fabric on their outer surfaces and individual rub strips (not shown) on their inner surfaces where the cab sides abut the vehicle frame. A rub strip 61 is sewn or otherwise attached to the inside surface of an upper edge 62 of the side window section 51. Such construction for the rear window section 52 is the same as that for the front window section 51 illustrated in FIG. 2.

Intermediate the front and rear side window sections 51, 52 on each side face 22 is a door 63 which affords passage for the operator in and out of the cab. The door 63 is mainly formed of a rectangular piece of window material 64. At its lower margin, the door window material 64 is provided on its exterior with a strip of coated fabric 65, and on its interior with a rub strip (not shown), where it abuts the frame of the vehicle. The coated fabric strip 65 and underlying rub strip are sewn or otherwise affixed to the door window material 64.

Figure 2:
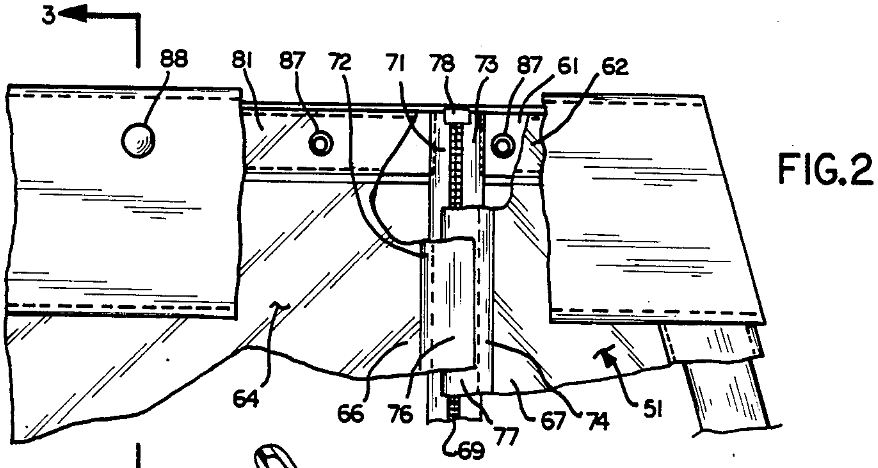
FIG. 2 is an enlarged, fragmentary view of a portion of the cab within an area bounded by an elliptical double-ended arrow indicated in FIG. 1.

The door 63 has generally vertical edges 66 that are horizontally spaced from respective overhead guard corner posts 13,14. These door edges 66 are closely adjacent vertical edges 67,68 of the side window sections 51,52, and are releasably coupled to such edges by mechanical fastener means in the form of individual continuous zippers 69,70. FIG. 2 illustrates a typical zipper closure arrangement for each vertical edge 66 of the door 63. One-half 71 of a zipper element 69 is sewn or otherwise permanently affixed to the inner side of a vertical door window edge 66. On the outer side of the door window edge is sewn or otherwise affixed a strip of coated fabric 72. On the adjacent inner side of a window section 67, there is sewn a complementary zipper half 73, and on the outer side of such edge is sewn a strip of coated fabric 74. Both coated fabric strips 72, 74 have mutually overlapping free flaps 76, 77 for protecting the zipper from rain.

The zipper slides not shown of each door zipper 69, 70 are both moved toward the upper end 78 of the zippers to open the door 63. In the disclosed arrangement where the door width is substantially less than the width of the side face 22 of the cab 10 and is generally centered in such side face by provision of the side window sections 51, 52, the zippers 69, 70 are within convenient hand reach of the operator when occupying the cab. If desired, with the zippers 69, 70 open, the door can be rolled on itself about a horizontal axis from its lower end to its upper end and can then be stored in a rolled condition by a strap (not shown) attached to the roof panel 39.

At its upper edge 81, each door window 64 has a rub strip 82 sewn along its inner side. While not shown in FIG. 3, a strip of coated fabric may be sewn to the outer side of this upper door edge 81. Each door 63 is removably secured to the remainder of the cab 10 by snap assemblies 86. The assemblies 86 are conventional snap fasteners used in the fabric cab industry. Each assembly includes an outwardly facing male part 87 permanently fixed to the upper edge 81 of the door 63 and an inwardly facing female part 88 permanently fixed to the drip shield 46. As shown, several snap fastener assemblies 86 are spaced along the upper edge 81 of the door 63 and the drip shield 46. When installed, the upper door edge 81 is lapped by the drip shield 46 in a rainproof manner such that the lower edge 49 of the shield is outward and below the upper door edge. The door 63 can be completely removed for repair or replacement by upwardly unzipping the zippers 69 and unsnapping the associated door fasteners 86.

In the same manner as that described for the doors 63, the upper side window edges 62 are provided with male snap elements 86 that register and mate with female snap elements 88 on the roof drip shield 46. The upper edges 62 of the side window sections 51,52 are not directly sewn or otherwise attached to the drip shield 46 besides the releasable snap fastener attachment provided by the snap assemblies 86.

It will be understood from the foregoing description that the front side window section 51 is permanently attached as by sewing to the windshield 26 of the front cab face 21 through the medium of the associated corner strip 28. In similar fashion, the rear side window section 52 is permanently attached to the rear face 23. After its manufacture, the cab 10 can be stored in inventory and shipped to a customer in a collapsed condition which, according to the invention, avoids permanent creasing or other distortion of the various flat panel elements of the cab faces and the window elements in particular. More specifically, the snap fastener assemblies 86 for ultimately joining the front and rear side face window sections 51, 52 to the drip shield 46 may be left unsecured, i.e. unsnapped, so that the front side window section 51 may be folded flat against the front cab face 21 and, similarly, the rear side window section 52 can be folded flat against the rear cab face 23. In such conditions, the respective fabric corner strips 28 form living hinges at their respective folds 32. Where desired, for folding of the cab, to collapse its structure the doors may be unfastened at the assemblies 86 also.

It can be further understood that the cab structure can be reduced to a generally flat pile of fabric and sheet elements by folding it, for example, at the front and rear edges of the roof panel 39 with the folds 47 acting as living hinges. From this flattened condition, the cab can be rolled on itself into a cylinder of limited bulk ideal for storage or shipment.

The cab 10, once fitted in place over the overhead guard, can be held in position by use of blind rivets or like mechanical fasteners which are caused to pierce strategic points of the cab and embed themselves in the overhead guard or in the frame of the vehicle 11.

From the foregoing description, it will be understood that the fabric cab 10 of the invention affords several benefits. By forming the margins of various cab faces from separate strips of coated fabric material sewn together, very little fabric waste is encountered as compared to prior art techniques. Additionally, the thin line or limited width of the marginally disposed fabric strips affords a high degree of visibility to the operator of the cab. As will be understood, in fact, the disclosed cab structure at most strategic points does not significantly restrict vision beyond that which is already restricted by the underlying portions of the overhead guard. As previously mentioned, the rub strips serve the dual purposes of avoiding abrasion wear-through at points in the cab where they rest against the overhead guard or the vehicle frame and at the same time spread tensile forces in the stitches across a broader area than would otherwise be experienced by the window material where the rub strips were not present. While the various elements of the cab have been described as being assembled together by thread stitches, it will be understood that other known techniques can be used for purposes of fastening the various elements together, such as by the use of rivets, adhesives, solvent or thermal welding or the like.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A fabric cab for a work vehicle having front and rear end faces, side faces and a roof face for enclosing an operator station of the vehicle, each of said faces having the general form of a quadrilateral, said faces having windows formed by transparent flexible sheet window material, the window material of at least one end face extending across substantially the full area of such end face, separate fabric elements affixed to and extending along horizontal and vertical edges of the one end window, adjacent portions of the fabric elements adjacent the corners of the one end window being directly secured together, two of said separate fabric elements extending generally vertically along opposite vertical edges of said one end window, each of said two vertical separate fabric elements being wrapped around associated corners of the cab and being affixed to generally vertical edges of side windows, said two vertical separate fabric elements being elongate strips each having a permanently set longitudinal fold disposed at a cab corner formed by the intersection of the planes of the one end face and the associated side face, each of said vertical strips having principal areas extending in both the plane of the one end face and its associated side face.

2. A fabric cab as set forth in claim 1, wherein said two separate fabric elements are disposed on the outer side of said one end window.

3. A fabric cab as set forth in claim 1, wherein said folds are permanently formed by thread stitches.

4. A fabric cab for a work vehicle having front and rear end faces, side faces and a roof face for enclosing the operator station of the vehicle, each of said faces having a general form of a quadrilateral, said faces having windows formed by transparent flexible sheet window material, the window of the front end face extending across substantially the full area of such end face, separate fabric corner strips extending along and being fixed to the outer surfaces of opposite vertical edges of said sheet window material, each of said separate fabric strips having a permanent longitudinal fold, being wrapped around an associated corner of the cab, and extending along and being affixed to the outer surfaces of generally vertical faces of said sheet window material, fabric rub strip means extending along and affixed to the inner side of said opposite vertical edges of said sheet window material and interposed between such edges and its adjacent corner post, to substantially fully protect such edges, including the locations at which said fabric strips are fixed to the edges of said sheet window material, from abrasion with corner posts of an overhead guard on the vehicle to which the fabric cab is fitted.

* * * * *